US012603229B2

(12) United States Patent
Lee et al.

(10) Patent No.:     US 12,603,229 B2
(45) Date of Patent:        Apr. 14, 2026

(54) MULTILAYERED ELECTRONIC COMPONENT

(71) Applicant: SAMSUNG ELECTRO-MECHANICS CO., LTD., Suwon-si (KR)

(72) Inventors: Byung Hun Lee, Suwon-si (KR); Sang Won Choi, Suwon-si (KR); Kun Hoi Koo, Suwon-si (KR); Ho Jae Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 151 days.

(21) Appl. No.: 18/753,699

(22) Filed: Jun. 25, 2024

(65)              Prior Publication Data

US 2025/0054702 A1      Feb. 13, 2025

(30)        Foreign Application Priority Data

Aug. 7, 2023     (KR) ......................... 10-2023-0102776

(51) Int. Cl.
  *H01G 4/012*           (2006.01)
  *H01G 4/008*           (2006.01)
          (Continued)
(52) U.S. Cl.
  CPC .............. *H01G 4/30* (2013.01); *H01G 4/008* (2013.01); *H01G 4/012* (2013.01); *H01G 4/12* (2013.01); *H01G 4/224* (2013.01)
(58) Field of Classification Search
  CPC .......... H01G 4/30; H01G 4/008; H01G 4/012; H01G 4/12; H01G 4/224; H01G 4/0085; H01G 4/232; H01G 4/1209; Y02E 60/13
  See application file for complete search history.

(56)               References Cited

U.S. PATENT DOCUMENTS 9,842,693 B2 *  12/2017  Iwama ................... H01G 4/385
10,777,357 B2 *  9/2020  Kim ....................... H01G 4/012
              (Continued)

FOREIGN PATENT DOCUMENTS

CN        215868985 U      2/2022
JP        H07-135124 A      5/1995
              (Continued)

OTHER PUBLICATIONS

Extended European Search Report dated Mar. 25, 2025 issued in the corresponding European Patent Application No. 24184280.6.

*Primary Examiner* — Dion R. Ferguson

(74) *Attorney, Agent, or Firm* — Morgan Lewis & Bockius LLP

(57)              ABSTRACT

A multilayer electronic component includes a body having a first internal electrode, a second internal electrode, and a first auxiliary electrode and a second auxiliary electrode spaced apart from each other, in which the first internal electrode and the second internal electrode are alternately arranged with the first and second auxiliary electrode layers interposed therebetween; a first external electrode connected to the first internal electrode and the first auxiliary electrode; and a second external electrode connected to the second internal electrode and the second auxiliary electrode, in which at least a portion of the first internal electrode overlaps the second auxiliary electrode, and at least a portion of the second internal electrode overlaps the first auxiliary electrode.

16 Claims, 6 Drawing Sheets

(51) Int. Cl.
    *H01G 4/12*         (2006.01)
    *H01G 4/224*       (2006.01)
    *H01G 4/30*         (2006.01)

(56)            References Cited

U.S. PATENT DOCUMENTS

| | | | | |
|---|---|---|---|---|
| 10,840,024 | B2 * | 11/2020 | Lee | H01G 4/008 |
| 10,854,391 | B2 * | 12/2020 | Kim | H01G 4/232 |
| 11,538,635 | B2 * | 12/2022 | Kim | H01G 4/232 |
| 2007/0025054 | A1 * | 2/2007 | Tonogai | H01G 4/012 |
| | | | | 361/303 |
| 2008/0084651 | A1 * | 4/2008 | Oguni | H01G 4/012 |
| | | | | 361/303 |
| 2013/0241361 | A1 * | 9/2013 | Lee | H01G 4/012 |
| | | | | 336/200 |
| 2015/0016014 | A1 * | 1/2015 | Park | H01G 2/065 |
| | | | | 156/89.12 |
| 2015/0318110 | A1 * | 11/2015 | Lee | H01G 4/30 |
| | | | | 361/301.4 |

| | | | | |
|---|---|---|---|---|
| 2016/0163455 | A1 * | 6/2016 | Iwama | H01G 4/012 |
| | | | | 361/301.4 |
| 2018/0075968 | A1 * | 3/2018 | Nakanishi | H01G 4/232 |
| 2019/0148073 | A1 * | 5/2019 | Lee | H01G 4/008 |
| | | | | 361/306.3 |
| 2020/0043666 | A1 * | 2/2020 | Kim | H01G 4/30 |
| 2020/0105467 | A1 * | 4/2020 | Jeong | H01G 4/2325 |
| 2020/0258688 | A1 * | 8/2020 | Berolini | H01L 25/18 |
| 2022/0165499 | A1 * | 5/2022 | Kim | H01G 4/30 |
| 2025/0054702 | A1 * | 2/2025 | Lee | H01G 4/008 |

FOREIGN PATENT DOCUMENTS

| | | | | | |
|---|---|---|---|---|---|
| JP | H10-241993 | A | 9/1998 | | |
| JP | 2000-124057 | A | 4/2000 | | |
| JP | 2018-46104 | A | 3/2018 | | |
| JP | 2000-353636 | A | 12/2020 | | |
| KR | 10-0826071 | B1 | 4/2008 | | |
| KR | 10-2015-0125335 | A | 11/2015 | | |
| KR | 101659209 | B1 * | 9/2016 | | H01G 4/0085 |
| WO | 2006/129783 | A1 | 12/2006 | | |

* cited by examiner

− RELATED ART −

MULTILAYERED ELECTRONIC COMPONENT

CROSS-REFERENCE TO RELATED APPLICATION(S)

This application claims benefit of priority to Korean Patent Application No. 10-2023-0102776 filed on Aug. 7, 2023 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of any of various electronic products, such as an image display device, including a liquid crystal display (LCD) or a plasma display panel (PDP), a computer, a smartphone, or a mobile phone, serving to charge or discharge electricity therein or therefrom. The multilayer ceramic capacitor has a small size, implements high capacitance, and is easily mounted, and may thus be used as a component of various electronic devices.

Recently, demand for multilayer ceramic capacitors, which may be required for not only IT products such as existing smartphones, laptops, or the like, but also electric/electronic and industrial products such as electric vehicles, autonomous driving, or the like, has been increasing. Accordingly, research on products having high reliability in high pressure environments is required.

FIG. 8 is a cross-sectional view schematically illustrating a cross-section of a conventional multilayer ceramic capacitor. The conventional multilayer ceramic capacitor may include a body 10 including first and second internal electrodes 21 and 22 alternately disposed with a dielectric layer 11 therebetween, and first and second external electrodes 31 and 32 respectively connected to the first and second internal electrodes.

In the conventional multilayer ceramic capacitor, since an area of a capacitance formation portion in which the first and second internal electrodes 21 and 22 are alternately arranged with the dielectric layer 11 therebetween to form capacitance is large, there are problems in that, in a high-pressure environment, a large amount of deformation occurs due to shrinkage and expansion of a chip, and piezoelectric cracks occur in the body 10 due to the shrinkage and expansion of the chip.

To solve such problems, a method of increasing a thickness of a cover portion, a thickness of a margin portion, and/or a thickness of a dielectric layer, a method of introducing a buffer layer, or a method of introducing a floating electrode may be considered. However, since these methods may all reduce an area of a capacitance formation portion in an area of the body, capacitance of a multilayer ceramic capacitor may be inevitably lowered.

Accordingly, there is a need for research on a design of a multilayer structure that may improve a withstand voltage and suppress occurrence of cracks due to piezoelectric stress, while minimizing a decrease in capacitance of the multilayer ceramic capacitor.

SUMMARY

An aspect of the present disclosure is to improve a withstand voltage, suppress occurrence of cracks due to piezoelectric stress, and minimize a decrease in capacitance.

However, the object of the present disclosure is not limited to the above, and will be more easily understood in the process of describing specific embodiments of the present disclosure.

According to an aspect of the present disclosure, a multilayer electronic component includes a body having first and second surfaces opposing in a first direction, third and fourth surfaces connected to the first and second surfaces and opposing in a second direction, and fifth and sixth surfaces connected to the first to fourth surfaces and opposing in a third direction, and including a first internal electrode layer including a first dielectric layer and a first internal electrode disposed on the first dielectric layer, a second internal electrode layer including a second dielectric layer and a second internal electrode disposed on the second dielectric layer, and an auxiliary electrode layer including a third dielectric layer and a first auxiliary electrode and a second auxiliary electrode, disposed on the third dielectric layer and spaced apart from each other in the second direction, in which the first internal electrode layer and the second internal electrode layer are alternately disposed in the first direction with the auxiliary electrode layer interposed therebetween; a first external electrode disposed on the third surface and connected to the first internal electrode and the first auxiliary electrode; and a second external electrode disposed on the fourth surface and connected to the second internal electrode and the second auxiliary electrode, in which at least a portion of the first internal electrode overlaps the second auxiliary electrode in the first direction, and at least a portion of the second internal electrode overlaps the first auxiliary electrode in the first direction.

According to an aspect of the present disclosure, a multilayer electronic component includes a body having first and second surfaces opposing in a first direction, third and fourth surfaces connected to the first and second surfaces and opposing in a second direction, and fifth and sixth surfaces connected to the first to fourth surfaces and opposing in a third direction, the body comprising a plurality of first internal electrode layers each including a first dielectric layer and a first internal electrode disposed on the first dielectric layer, a plurality of second internal electrode layers each including a second dielectric layer and a second internal electrode disposed on the second dielectric layer, and a plurality of auxiliary electrode layers each including a third dielectric layer and first and second auxiliary electrodes disposed on the third dielectric layer and spaced apart from each other in the second direction, wherein the plurality of first internal electrode layers and the plurality of second internal electrode layers are alternately disposed in the first direction with each of the auxiliary electrode layers interposed therebetween; a first external electrode disposed on the third surface and connected to the first internal electrodes and the first auxiliary electrodes; and a second external electrode disposed on the fourth surface and connected to the second internal electrodes and the second auxiliary electrodes, in which at least a portion of the first internal electrodes overlaps the second auxiliary electrodes in the first direction, and at least a portion of the second internal electrodes overlaps the first auxiliary electrodes in the first direction, and some of the auxiliary electrode layers are disposed in a center portion of the body in the first direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
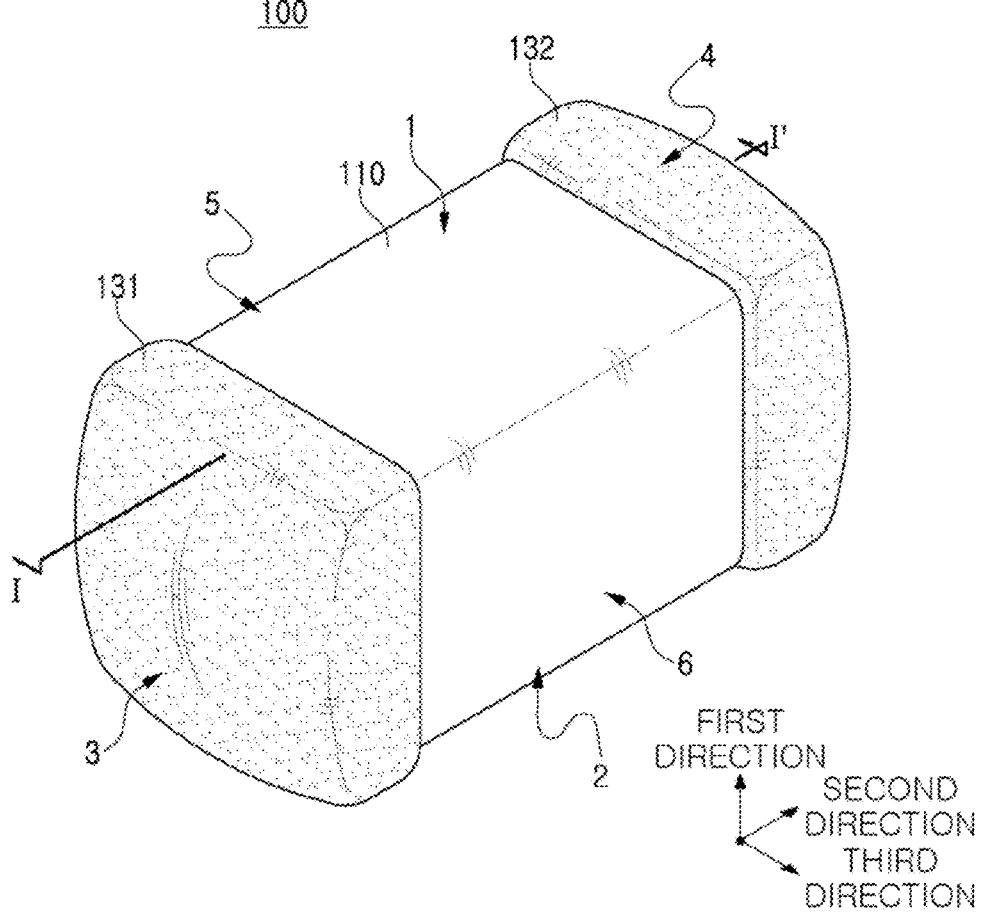
FIG. 1 perspective is a view schematically illustrating a multilayer electronic component according to an embodiment of the present disclosure.

Hereinafter, embodiments of the present disclosure will be described with reference to specific example embodiments and the attached drawings. The embodiments of the present disclosure may, however, be exemplified in many different forms and should not be construed as being limited to the specific embodiments set forth herein. The example embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

FIG. 1 is a view schematically perspective illustrating a multilayer electronic component according to an embodiment of the present disclosure.

Figure 2:
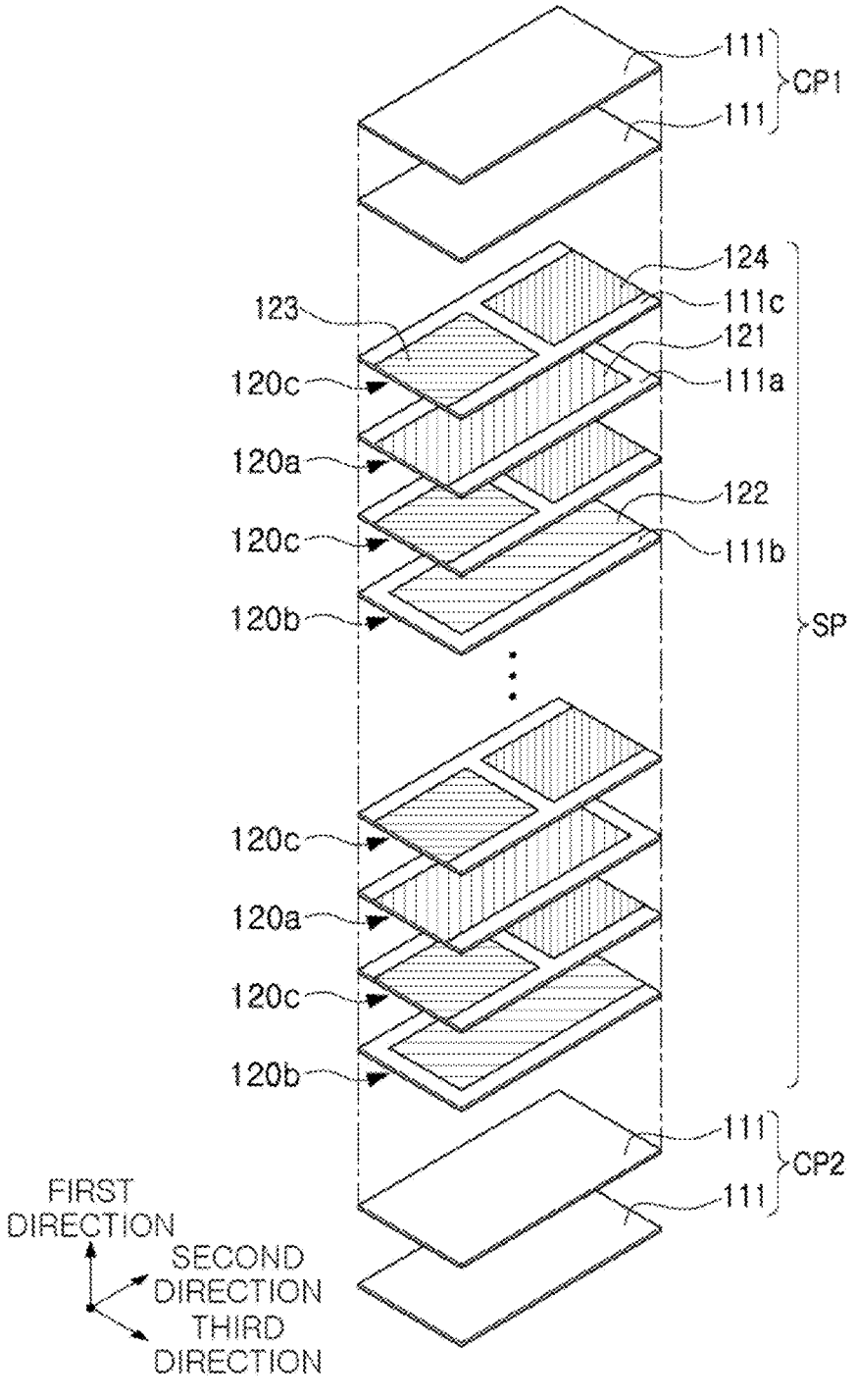
FIG. 2 is an exploded perspective view schematically illustrating a body of a multilayer electronic component according to an embodiment of the present disclosure.

FIG. 2 is an exploded perspective view schematically illustrating a body of a multilayer electronic component according to an embodiment of the present disclosure.

Figure 3:
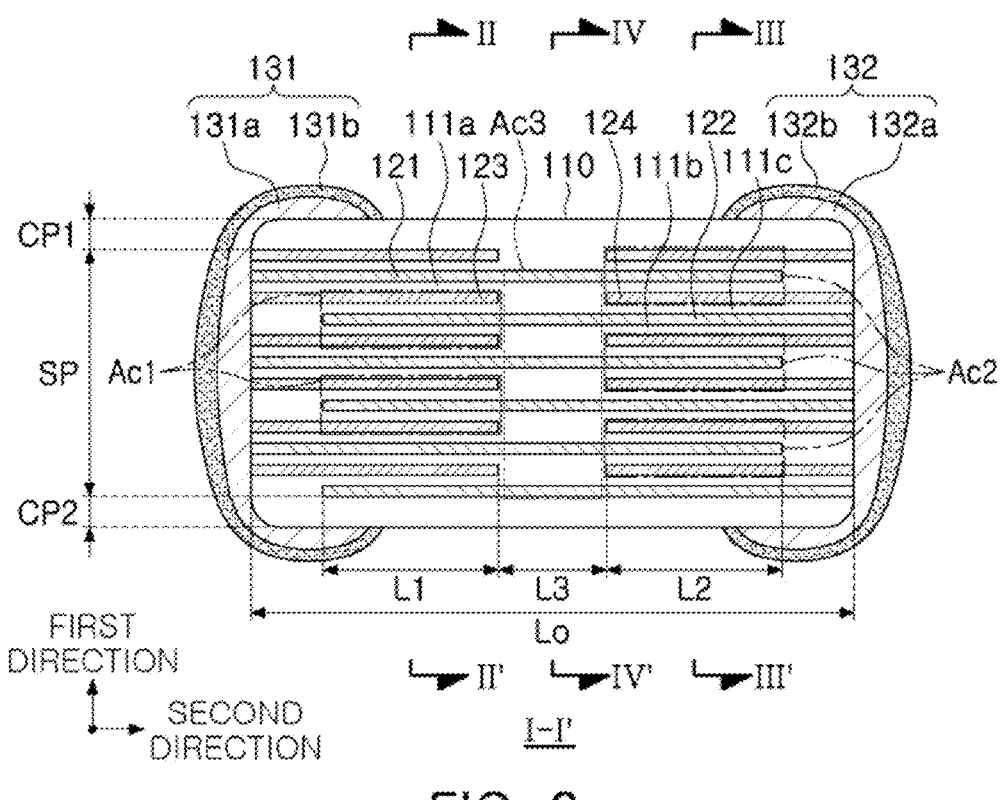
FIG. 3 is a cross-sectional view schematically illustrating a cross-section of FIG. 1, taken along line I-I'.

FIG. 3 is a cross-sectional schematically illustrating a cross-section of FIG. 1, taken along line I-I'.

Figure 4:
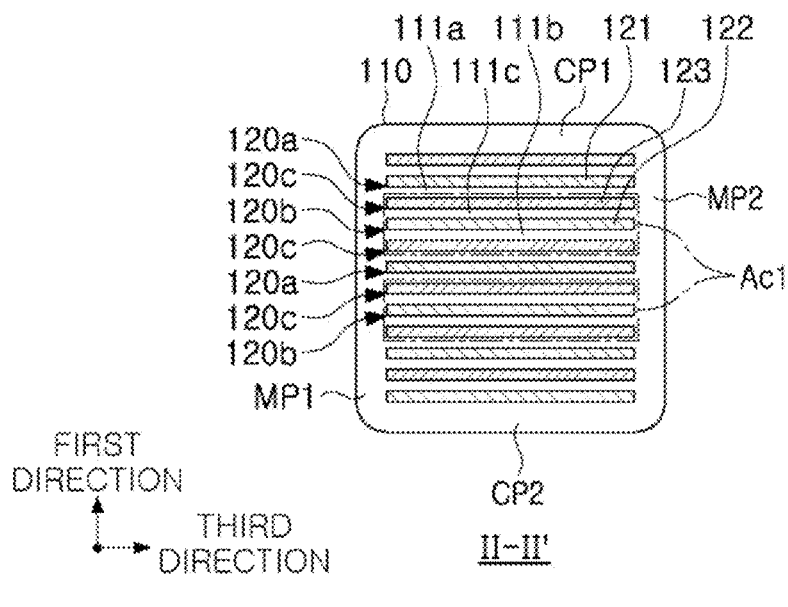
FIG. 4 is a cross-sectional view schematically illustrating a cross-section of FIG. 3, taken along line II-II'.

FIG. 4 is a cross-sectional view schematically illustrating a cross-section of FIG. 3, taken along line II-II'.

Figure 5:
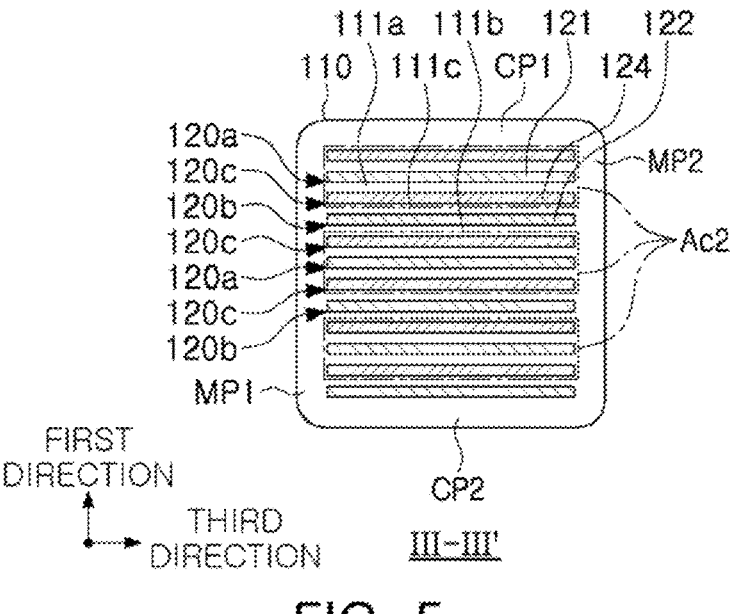
FIG. 5 is a cross-sectional view schematically illustrating a cross-section of FIG. 3, taken along line III-III'.

FIG. 5 is a cross-sectional view schematically illustrating a cross-section of FIG. 3, taken along line III-III'.

Figure 6:
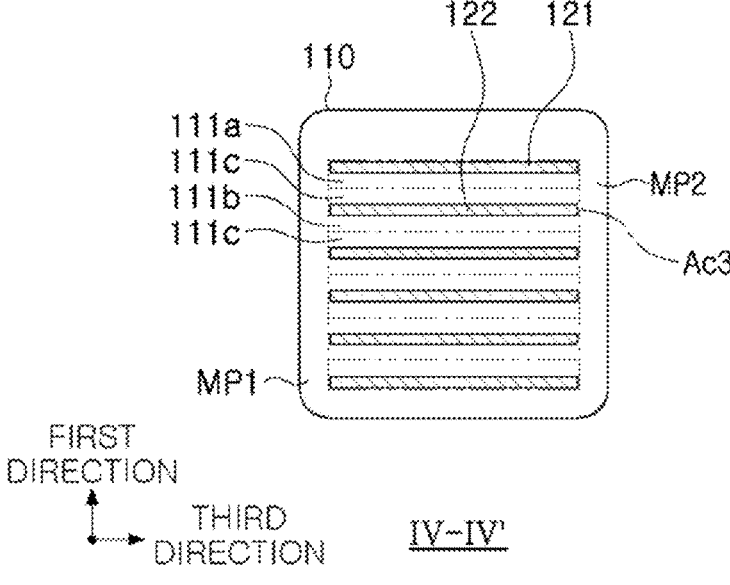
FIG. 6 is a cross-sectional view schematically illustrating a cross-section of FIG. 3, taken along line IV-IV'.

FIG. 6 is a cross-sectional view schematically illustrating a cross-section of FIG. 3, taken along line IV-IV'.

Hereinafter, a multilayer electronic component 100 according to an embodiment of the present disclosure will be described in detail with reference to FIGS. 1 to 6. In addition, a multilayer ceramic capacitor (hereinafter referred to as 'MLCC') will be described as an example of the multilayer electronic component, but the present disclosure is not limited thereto, and may also be applied to various multilayer electronic components, such as an inductor, a piezoelectric element, a varistor, a thermistor, or the like.

A multilayer electronic component 100 according to an embodiment of the present disclosure may include a body 110 in which a first internal electrode layer 120a and a second internal electrode layer 120b are alternately disposed in a first direction with an auxiliary electrode layer 120c interposed therebetween, and external electrode (131 and 132).

Although the detailed shape of the body 110 is not particularly limited, as illustrated, the body 110 may have a hexahedral shape or a shape similar thereto. Due to shrinkage of ceramic powder included in the body 110 or polishing of corners during a sintering process, the body 110 may not have a hexahedral shape with perfect straight lines, but may substantially have a hexahedral shape.

The body 110 may have first and second surfaces 1 and 2 opposing in a first direction, third and fourth surfaces 3 and 4 connected to the first and second surfaces 1 and 2 and opposing in a second direction, and fifth and sixth surfaces 5 and 6 connected to the first to fourth surfaces 1, 2, 3, and 4 and opposing in a third direction.

A plurality of dielectric layers 111 forming the body 110 may be in a sintered state, and a boundary between adjacent dielectric layers 111 may be integrated to the extent that it is difficult to confirm without using a scanning electron microscope (SEM). The plurality of dielectric layers 111 may include a first dielectric layer 111a on which a first internal electrode 121 is disposed, a second dielectric layer 111b on which a second internal electrode 122 may be disposed, and a third dielectric layer 111c on which first and second auxiliary electrode (123 and 124) are spaced apart from each other in the second direction. Hereinafter, the description of the dielectric layers 111 may be equally applied to first to third dielectric layers 111a, 111b, and 111c.

The dielectric layer 111 may be formed by preparing a ceramic slurry containing ceramic powder particles, an organic solvent, and a binder, applying and drying the slurry on a carrier film to prepare a ceramic green sheet, and then sintering the ceramic green sheet. The ceramic powder particles are not particularly limited as long as sufficient capacitance may be obtained therewith. For example, a barium titanate-based material, a lead composite perovskite-based material, a strontium titanate-based material, or the like may be used. Examples of the ceramic powder particles may include $BaTiO_3$, or $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), $Ba(Ti_{1-y}Zr_y)O_3$ (0<y<1), or the like, in which calcium (Ca), zirconium (Zr), or the like is partially dissolved in $BaTiO_3$, or the like.

The body 110 may include a first internal electrode layer 120a including a first dielectric layer 111a and a first internal electrode 121 disposed on the first dielectric layer, a second internal electrode layer 120b including a second dielectric layer 111b and a second internal electrode 122 disposed on the second dielectric layer, and an auxiliary electrode layer 120c including a third dielectric layer 111c, and a first auxiliary electrode 123 and a second auxiliary electrode 124, disposed on the third dielectric layer, to be spaced apart from each other in the second direction, wherein the first internal electrode layer 120a and the second internal electrode layer 120b may be alternately disposed in the first direction with the auxiliary electrode layer 120c interposed therebetween.

The first internal electrode 121 of the first internal electrode layer 120a may be exposed to the third surface 3 and spaced apart from the fourth surface 4. The second internal electrode 122 of the second internal electrode layer 120b may be exposed to the fourth surface 4 and spaced apart from the third surface 3. In the auxiliary electrode layer 120c, the first auxiliary electrode 123 may be exposed to the third surface 3, and the second auxiliary electrode 124 may be exposed to the fourth surface 4.

Therefore, the first internal electrode 121 of the first internal electrode layer 120a and the first auxiliary electrode 123 of the auxiliary electrode layer 120c may be connected to the first external electrode 131 disposed on the third surface 3, and the second internal electrode 122 of the second internal electrode layer 120b and the second auxiliary electrode 124 of the auxiliary electrode layer 120c may be connected to the second external electrode 132 disposed on the fourth surface 4.

In one embodiment, some of the auxiliary electrode layers 120c may be disposed in a center portion of the body 110 in the first direction.

A conductive metal included in the internal electrode (121 and 122) and the auxiliary electrode (123 and 124) may be one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The internal electrode (121 and 122) and the auxiliary electrode (123 and 124) may be formed by applying and sintering a conductive paste containing the conductive metal to have a predetermined thickness on a ceramic green sheet. A printing method of the conductive paste may use a screen-printing method, a gravure printing method, or the like, but the present disclosure is not limited thereto.

According to an embodiment of the present disclosure, at least a portion of the first internal electrode 121 may overlap the second auxiliary electrode 124 in the first direction, and at least a portion of the second internal electrode 122 may overlap the first auxiliary electrode 123 in the first direction.

As in the prior art, when the first and second internal electrode layers 120a and 120b are alternately disposed without the auxiliary electrode layer 120c, and a high voltage is applied to the external electrode (131 and 132), an electric field may be applied to a capacitance formation portion having a large area, to occur large degrees of contraction and expansion of the body 110, and there may be a problem in that piezoelectric cracks occur in the body 110 due to such contraction and expansion.

According to an embodiment of the present disclosure, a capacitance formation portion (Ac1, Ac2, and Ac3) may be provided as a plurality of capacitance formation portions (Ac1, Ac2, and Ac3) by the auxiliary electrode layer 120c disposed between the first internal electrode layer 120a and the second internal electrode layer 120b. Since voltage applied to each of the capacitance formation portions (Ac1, Ac2, and Ac3) may be efficiently distributed, piezoelectric stress may be resolved and occurrence of cracks caused thereby may be prevented. In particular, in an embodiment of the present disclosure, at least a portion of the first internal electrode 121 may overlap the second auxiliary electrode 124 in the first direction, and at least a portion of the second internal electrode 122 may overlap the first auxiliary electrode 123 in the first direction, such that capacitance may also be formed between the first internal electrode 121 and the second auxiliary electrode 124 and between the second internal electrode 122 and the first auxiliary electrode 123, as well as between the first internal electrode 121 and the second internal electrode 122. As a result, it is possible to improve withstand voltage and minimize a decrease in capacitance of the multilayer electronic component 100.

Hereinafter, the capacitance formation portion (Ac1, Ac2, and Ac3) will be described in more detail. Referring to FIGS. 3 and 4, the body 110 may include a plurality of first capacitance formation portions Ac1 in which two first auxiliary electrodes 123 adjacent to each other in the first direction are disposed with the second internal electrode 122 interposed therebetween. Additionally, referring to FIGS. 3 and 5, the body 110 may include a plurality of second capacitance formation portions Ac2 in which two second auxiliary electrodes 124 adjacent to each other in the first direction are disposed with the first internal electrode 121 interposed therebetween.

The plurality of first capacitance formation portions Ac1 and the plurality of second capacitance formation portions Ac2 may be arranged in the first direction. Additionally, as illustrated in FIG. 3, the plurality of first capacitance formation portions Ac1 may be arranged to be staggered with the plurality of second capacitance formation portions Ac2.

The plurality of first capacitance formation portions Ac1 spaced apart from each other may be formed because the first internal electrode 121 and the first auxiliary electrodes 123, having the same polarity, between the two first capacitance formation portions Ac1 disposed adjacent to each other, face each other. Likewise, the plurality of second capacitance formation portions Ac2 spaced apart from each other may be formed because the second internal electrode 122 and the second auxiliary electrodes 124, having the same polarity, between the two second capacitance formation portions Ac2 disposed adjacent to each other, face each other.

Piezoelectric stress may be proportional to the square of an electric field (V/d, where V is voltage, and d is a distance between electrodes), and may be proportional to the number of stacks of dielectric layers disposed between electrodes. Since the total stack number of dielectric layers 111b and 111c included in the plurality of first capacitance formation portions Ac1 and the total stack number of dielectric layers 111a and 111c included in the plurality of second capacitance formation Ac2 may portions be respectively approximately half that of the conventional multilayer ceramic capacitor illustrated in FIG. 8, piezoelectric stress acting on the plurality of first and second capacitance formation portions Ac1 and Ac2 may be effectively reduced.

In addition, the body 110 may include a third capacitance formation portion Ac3 in which the first internal electrode 121 and the second internal electrode 122 are alternately disposed through a region in which the first auxiliary electrode 123 and the second auxiliary electrode 124 are spaced apart from each other in the second direction.

For example, unlike the first and second capacitance formation portions Ac1 and Ac2, which may be formed in plural, one third capacitance formation portion Ac3 may be formed in a central portion of the body 110 in the second direction through a region in which the first auxiliary electrode 123 and the second auxiliary electrode 124 are spaced apart from each other in the second direction. Therefore, a size of the third capacitance formation portion Ac3 in the first direction may be larger than a size of the second capacitance formation portion Ac2 and a size of the third capacitance formation portion Ac3 in the first direction, respectively.

In addition, unlike the first and second capacitance formation portions Ac1 and Ac2, the third capacitance formation portion Ac3 may have two dielectric layers disposed between the first internal electrode 121 and the second internal electrode 122. For example, as illustrated in FIG. 6, between the first internal electrode 121 and the second internal electrode 122, the first dielectric layer 111a and the third dielectric layer 111c stacked in the first direction may be disposed, or the second dielectric layer 111b and the third dielectric layer 111c may be stacked in the first direction. Since the total stack number of dielectric layers included in the third capacitance formation portion Ac3 is half that of the conventional multilayer ceramic capacitor illustrated in FIG. 8, and a distance d between electrodes in the third capacitance formation portion Ac3 is about twice that of the first and second capacitance formation portions Ac1 and Ac2 or the capacitance formation portion of the conventional multilayer ceramic capacitor illustrated in FIG. 8, piezoelectric stress acting on the third capacitance formation portion Ac3 may be reduced to be about ⅛ of that of the conventional multilayer ceramic capacitor.

For example, a multilayer electronic component 100 according to an embodiment of the present disclosure may reduce piezoelectric stress acting on each of the capacitance formation portions, but may form several capacitance formation portions, e.g., first to third capacitance formation portions Ac1, Ac2, and Ac3, to minimize degradation of capacitance.

In an embodiment, based on cross-sections of the body 110 in the first and second directions, $L1+L2>L3$ may be satisfied, when $L1$ is a length at which the second internal electrode 122 and the first auxiliary electrode 123 overlap each other in the first direction, $L2$ is a length at which the first internal electrode 121 and the second auxiliary electrode 124 overlap each other in the first direction, and $L3$ is a distance at which the first auxiliary electrode 123 and the second auxiliary electrode 124 are spaced apart from each other in the second direction.

A distance in the first direction between the first internal electrode 121 and the second internal electrode 122 in the third capacitance formation portion Ac3 may be about twice a distance in the first direction between the internal electrode (121 and 122) and the auxiliary electrode (123 and 124) in the first and second capacitance formation portions Ac1 and Ac2. Therefore, as the distance L3 between the first auxiliary electrode 123 and the second auxiliary electrode 124 in the second direction increases, although an area occupied by the third capacitance formation portion Ac3 may increase to reduce piezoelectric stress, since capacitance may be inversely proportional to the distance d between electrodes, the third capacitance formation portion Ac3 may be disadvantageous in terms of implementation of capacitance, as compared to the first and second capacitance formation portions Ac1 and Ac2. Therefore, to realize capacitance of the multilayer electronic component 100, it is desirable to satisfy $L1+L2>L3$. Additionally, to realize capacitance of the multilayer electronic component 100, it is desirable to satisfy $L1>L3$ and $L2>L3$, respectively.

$L1$ and $L2$ do not need to be particularly limited, but for example, if $Lo$ is a size of the body in the second direction, $0.5\times Lo \leq L1+L2 \leq 0.9\times Lo$ may be satisfied. When $L1+L2$ is less than 0.5, it may be difficult to implement capacitance of the multilayer electronic component 100, and when it exceeds $0.9\times Lo$, an effect of reducing piezoelectric stress may be minimal.

$L3$ is not particularly limited, but, for example, $0.05\times Lo \leq L3 \leq 0.4\times Lo$ may be satisfied. When $L3$ is less than $0.05\times Lo$, an effect of reducing piezoelectric stress may be minimal, and there may be a risk that a short circuit occurs between the first auxiliary electrode 123 and the second auxiliary electrode 124. Additionally, when $L3$ is greater than $0.4\times Lo$, it may be difficult to implement capacitance of the multilayer electronic component 100.

For example, $L1$ to $L3$ may be measured by scanning cross-sections in the first and second directions cut from a center of the body 110 in the third direction with a scanning electron microscope (SEM). More specifically, $L1$ to $L3$ may refer to, among the cross-sections of the body 110 in the first and second directions, an overlap length $L1$ of the second internal electrode 122 and the first auxiliary electrode 123, adjacent to each other, disposed in a central region of the cross-sections in the first direction, an overlap length $L2$ of the first internal electrode 121 and the second auxiliary electrode 124, adjacent to each other, disposed in the central region of the cross-sections in the first direction, and a distance $L3$ at which the first auxiliary electrode 123 and the second auxiliary electrode 124, disposed in the central region of the cross-section in the first direction, are spaced apart from each other in the second direction. To more generalize $L1$ to $L3$, $L1$ may be an average value measured from 10 pairs of second internal electrode 122 and the first auxiliary electrode 123, $L2$ may be an average value measured from 10 pairs of first internal electrode 121 and the second auxiliary electrode 124, and $L3$ may be an average value measured from 10 pairs of first auxiliary electrode 123 and the second auxiliary electrode 124. $Lo$ may mean a maximum size of the body 110 in the second direction, when the first and second direction sections cut from the center of the body 110 in the third direction are scanned with a scanning electron microscope (SEM).

The body 110 may include a stacked portion SP on which the first internal electrode layer 120a and the second internal electrode layer 120b are alternately disposed with the auxiliary electrode layer 120c interposed therebetween, and a first cover portion CP1 and a second cover portion CP2, respectively disposed on both surfaces of the stacked portion opposing each other in the first direction. The cover portions CP1 and CP2 may basically serve to prevent damage to the internal electrodes due to physical or chemical stress.

The first internal electrode 121, the second internal electrode 122, the first auxiliary electrode 123, and the second auxiliary electrode 124 may not be disposed in the cover portions CP1 and CP2, and may have a structure on which a single or two or more dielectric layers 111 are stacked.

In one embodiment, there may be no first and second internal electrodes 121 and 122 that are directly adjacent to each other without any of the first and second auxiliary electrodes 123 and 124 interposed therebetween in the stacked portion SP.

There may be no need to specifically limit an average thickness of the cover portions CP1 and CP2. To miniaturize and increase capacitance of the multilayer electronic component, the average thickness of the cover portions CP1 and CP2 may be 300 μm, 200 μm or less, 100 μm or less, 30 μm or less, or 20 μm or less. In this case, the average thickness of the cover portions CP1 and CP2 means the average thickness of each of the first cover portion CP1 and the second cover portion CP2.

The average thickness of the cover portions CP1 and CP2 may mean an average size of the cover portions CP1 and CP2 in the first direction, and may be an average value of sizes in the first direction measured at five equally spaced points in the second direction, based on cross-sections of the body 110 in the first and second directions.

Figure 7:
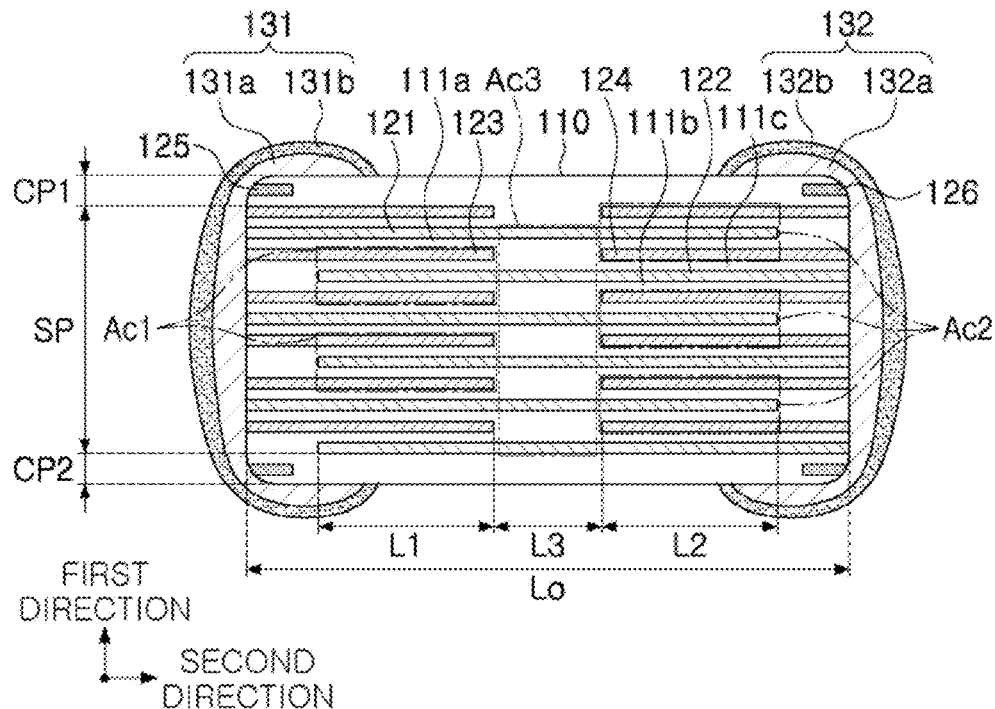
FIG. 7 is a modified example of FIG. 3.

FIG. 7 is a modified example of FIG. 3. Referring to FIG. 7, cover portions CP1 and CP2 may include a first dummy electrode 125 connected to a first external electrode 131, and a second dummy electrode 126 spaced apart from the first dummy electrode and connected to a second external electrode 132.

The dummy electrode (125 and 126) may serve to improve moisture resistance reliability and mechanical strength of a multilayer electronic component. There is no need to specifically limit the number or a shape of the dummy electrode (125 and 126), but for example, a size of the dummy electrode (125 and 126) in the second direction may be smaller than a size of the auxiliary electrode (123 and 124) in the second direction. In addition, in the drawings, the first dummy electrode 125 and the second dummy electrode 126 may be disposed in singular, respectively, but the present disclosure is not limited thereto, and the first dummy electrode 125 and the second dummy electrode 126 may be arranged in plural according to a purpose.

The body 110 may include a first margin portion MP1 and a second margin portion MP2, respectively disposed on both surfaces of the stacked portion SP opposing each other in the third direction. For example, the margin portions MP1 and MP2 may be a region from an end portion of the internal electrode (121 and 122) and an end portion of the auxiliary electrode (123 and 124), to an interface of the body 110, in cross-sections of the body 110 in the first and third directions.

The margin portions MP1 and MP2 may include a material, identical to a material of the dielectric layer 111, except that the internal electrode (121 and 122) or the auxiliary electrode (123 and 124) are not disposed. The margin portions MP1 and MP2 may basically serve to prevent damage to the internal electrode (121 and 122) and the auxiliary electrode (123 and 124) due to physical or chemical stress.

The margin portions MP1 and MP2 may be formed by applying and sintering a conductive paste on a ceramic green sheet, except for a region in which the margin portions are formed. Alternatively, to suppress a step difference, after stacking, the internal electrode (121 and 122) and the auxiliary electrode (123 and 124) may be cut to expose the fifth and sixth surfaces 5 and 6 of the body, and then a single dielectric layer or two or more dielectric layers may be stacked on both surfaces of the stacked portion SP opposing each other in the third direction to form the margin portions MP1 and MP2.

There may be no need to specifically limit an average thickness of the margin portions MP1 and MP2. However, to miniaturize and increase capacitance of the multilayer electronic component, the average thickness of the margin portions MP1 and MP2 may be 100 μm or less, 20 μm or less, or 15 μm or less. In this case, the average thickness of the margin portions MP1 and MP2 refers to an average thickness of each of the first margin portion MP1 and the second margin portion MP2.

The average thickness of the margin portions MP1 and MP2 may an average value of sizes in the third direction measured at five equally spaced points, based on cross-sections of the body 110 in the first and third directions.

The external electrodes 131 and 132 may be disposed on the third and fourth surfaces 3 and 4 of the body 110, and may be disposed to extend on portions of the first, second, fifth, and sixth surfaces 1, 2, 5, and 6. The external electrodes 131 and 132 may include a first external electrode 131 connected to the first internal electrode 121 and the first auxiliary electrode 123, and a second external electrode 132 connected to the second internal electrode 122 and the second auxiliary electrode 124.

The external electrodes 131 and 132 may include electrode layers 131a and 132a disposed on the third and fourth surfaces 3 and 4 of the body 110 and connected to the internal electrode (121 and 122) and the auxiliary electrode (123 and 124), and plating layers 131b and 132b disposed on the electrode layers 131a and 132a. Specifically, the first external electrode 131 may include a first electrode layer 131a disposed on the third surface 3 and connected to the first internal electrode 121 and the first auxiliary electrode 123, and a first plating layer 131b disposed on the first electrode layer 131a, and the second external electrode 132 may include a second electrode layer 132a disposed on the fourth surface 4 and connected to the second internal electrode 122 and the second auxiliary electrode 124, and a second plating layer 132b disposed on the second electrode layer 132a.

The electrode layers 131a and 132a may include a conductive metal and glass. The conductive metal included in the electrode layers 131a and 132a may serve to secure electrical connectivity, and the glass may serve to improve bonding force with the body 110.

The conductive metal included in the electrode layers 131a and 132a may be formed using any material as long as it has electrical conductivity, and the specific material may be determined in consideration of electrical characteristics, structural stability, or the like. For example, the conductive metal included in the electrode layers 131a and 132a may be one or more selected from the group consisting of nickel (Ni), copper (Cu), palladium (Pd), silver (Ag), gold (Au), platinum (Pt), tin (Sn), tungsten (W), titanium (Ti), and alloys thereof.

The electrode layers 131a and 132a may be comprised of only a single layer containing a conductive metal and glass, but the present disclosure is not limited thereto, and the electrode layers 131a and 132a may have a multilayer structure.

For example, the electrode layers 131a and 132a may include a first layer including a conductive metal and glass and a second layer disposed on the first layer and including a conductive metal and a resin. As the electrode layers 131a and 132a include the second layer, bending strength of the multilayer electronic component 100 may be improved.

The conductive metal included in the second layer is not particularly limited, and may be one or more selected from the group consisting of nickel (Ni), copper (Cu), palladium (Pd), silver (Ag), gold (Au), platinum (Pt), tin (Sn), tungsten (W), titanium (Ti), and alloys thereof.

The conductive metal included in the second layer may include one or more of spherical powder and flake-shaped powder. For example, the conductive metal included in the second layer may be made of only the flake-shaped powder, only the spherical powder, or may be a mixture of the flake-shaped powder and the spherical powder. In this case, the spherical powder may also include a shape that may not be completely spherical, for example, a shape in which a length ratio of a major axis and a minor axis (major axis/minor axis) is 1.45 or less. The flake-shaped powder refers to a powder having a flat and elongated shape, and is not particularly limited, but for example, the length ratio of the major axis to the minor axis (major axis/minor axis) may be 1.95 or more. Lengths of the major and minor axes of the spherical powder and the flake-shaped powder may be measured from images obtained by scanning cross-sections in the first and second directions cut from a central portion in the third direction of the multilayer electronic component with a scanning electron microscope (SEM).

The resin included in the second layer may secure bondability and absorb shock. The resin is not particularly limited as long as it has bonding properties and shock absorption properties, and may be mixed with a conductive metal powder to make a paste, and may include, for example, one or more types selected from an epoxy resin, an acrylic resin, an ethyl cellulose, or the like.

Additionally, the second layer may include a plurality of metal particles, an intermetallic compound, and a resin. By including the intermetallic compound, electrical connectivity with the first layer may be further improved. The intermetallic compound serves to improve electrical connectivity by connecting the plurality of metal particles, and may serve to surround and connect the plurality of metal particles to each other.

In this case, the intermetallic compound may include metal having a melting point, lower than a curing temperature of the resin. For example, because the intermetallic compound may include the metal having a melting point, lower than a curing temperature of the resin, the metal having a melting point, lower than a curing temperature of the resin, may melt during drying and curing processes, may form some of the metal particles and the intermetallic compound, and may surround the metal particle. In this case, the intermetallic compound may preferably include a low melting point metal of 300° C. or lower.

In an embodiment, the second layer may include Sn. During the drying and curing processes, Sn may melt, and the melted Sn may wet high melting point metal particles such as Ag, Ni or Cu by capillary action, and may react with some of the Ag, Ni or Cu metal particles, to form intermetallic compounds such as $Ag_3Sn$, $Ni_3Sn_4$, $Cu_3Sn_5$, $Cu_3Sn$, or the like. Ag, Ni or Cu that did not participate in the reaction may remain in the form of metal particles.

Therefore, the plurality of metal particles may include one or more of Ag, Ni, and Cu, and the intermetallic compound may include one or more of $Ag_3Sn$, $Ni_3Sn_4$, $Cu_6Sn_5$, and $Cu_3Sn$.

The plating layers 131b and 132b may improve mounting characteristics. Types of the plating layers 131b and 132b are not particularly limited, and may be plating layers containing nickel (Ni), tin (Sn), palladium (Pd), and/or an alloy containing these, and may be formed as a plurality of layers. The plating layers 131b and 132b may be, for example, a nickel (Ni) plating layer or a tin (Sn) plating layer, or may be prepared by sequentially forming the nickel (Ni) plating layer and the tin (Sn) plating layer. Additionally, the plating layers 131b and 132b may include a plurality of nickel (Ni) plating layers and/or a plurality of tin (Sn) plating layers.

Although the drawing illustrates a structure in which the multilayer electronic component 100 has two external electrodes 131 and 132, it is not limited thereto, and the number, shapes, or the like of the external electrodes 131 and 132 may vary depending on other purposes.

An average thickness of the dielectric layer 111 is not specifically limited, but may be, for example, 0.1 μm to 10 μm. Additionally, the average thickness of the dielectric layer 111 may be arbitrarily set depending on desired characteristics or purposes. For example, in high-voltage electric/electronic components, the average thickness of the dielectric layer may be less than 2.8 μm, and in small IT electronic components, the average thickness of the dielectric layer may be 0.4 μm or less to achieve miniaturization and high capacitance, but the present disclosure is not limited thereto.

An average thickness of the internal electrode (121 and 122) and an average thickness of the auxiliary electrode (123 and 124) do not need to be particularly limited, but may be, for example, 0.1 μm to 3 μm, respectively. In addition, the average thickness of the internal electrode (121 and 122) and the average thickness of the auxiliary electrode (123 and 124) may be arbitrarily set depending on desired characteristics or purposes. For example, in the high-voltage electric/electronic components, the average thickness of the internal electrodes (121 and 122) and the average thickness of the auxiliary electrode (123 and 124) may be less than 1 μm, and in the small IT electronic components, the average thickness of the internal electrodes (121 and 122) and the average thickness of the auxiliary electrode (123 and 124) may be 0.4 μm or less, respectively, to achieve miniaturization and high capacitance, but the present disclosure is not limited thereto.

In general, as a thickness of the dielectric layer 111 or the internal electrode (121 and 122) becomes thinner, cracks due to piezoelectric stress may easily occur, which may reduce reliability of the multilayer electronic component. A multilayer electronic component according to an embodiment of the present disclosure may have a structure in which the first internal electrode layer 120a and the second internal electrode layer 120b are alternately arranged with the auxiliary electrode layer 120c interposed therebetween, to efficiently distribute voltage applied to the capacitance formation portions (Ac1, Ac2, and Ac3). Therefore, even though the average thickness of the dielectric layer 111, the average thickness of the internal electrode (121 and 122), and the average thickness of the auxiliary electrode (123 and 124) are thinned to satisfy the above range, reliability of the multilayer electronic component may be good.

In an embodiment, if an average thickness of the dielectric layer 111 is td and an average thickness of the internal electrode (121 and 122) is te, td>2×te may be satisfied. In the high-voltage electric/electronic components, breakdown voltage characteristics may be improved by making the average thickness of the dielectric layer 111 greater than twice the average thickness of the internal electrode (121 and 122) to prevent a decrease in breakdown voltage in a high voltage environment.

In this case, the average thickness of the dielectric layer 111, the average thickness of the internal electrode (121 and 122), and the average thickness of the auxiliary electrode (123 and 124) means a size of the dielectric layer 111, a size of the internal electrode (121 and 122), and a size of the auxiliary electrode (123 and 124), respectively, in the first direction. The average thickness of the dielectric layer 111, the average thickness of the internal electrode (121 and 122), and the average thickness of the auxiliary electrode (123 and 124) may be determined by scanning cross-sections of the body 110 in the first and second directions using a scanning electron microscope (SEM) at a magnification of 10,000.

More specifically, the average thickness of the dielectric layer 111 may be determined by measuring thicknesses thereof at multiple points of one dielectric layer 111, for example, 30 points at equal intervals in the second direction. In addition, the average thickness of the internal electrode (121 and 122) may be determined by measuring thicknesses thereof at multiple points of one internal electrode (121 and 122), for example, 30 points at equal intervals in the second direction. The average thickness of the auxiliary electrode (123 and 124) may be determined by measuring thicknesses thereof at multiple points of one auxiliary electrode (123 and 124), for example, at 30 points at equal intervals in the second direction.

When such an average value is determined by extending the measurements of average values to 10 dielectric layers 111, 10 internal electrodes (121 and 122), and 10 auxiliary electrodes (123 and 124), the respective average thicknesses may be more generalized. The 30 equally spaced points may be designated in the stacked portion SP. For example, the average thickness of the dielectric layer 111 may mean an average thickness of the first dielectric layer 111*a*, an average thickness of the second dielectric layer 111*b*, and/or an average thickness of the third dielectric layer 111*c*.

An overall size of the multilayer electronic component 100 is not particularly limited. For example, a size of the multilayer electronic component 100 in the second direction may be 0.1 mm to 4.5 mm, a size of the multilayer electronic component 100 in the third direction may be 0.05 mm to 3.2 mm, and a size of the multilayer electronic component 100 in the first direction may be 0.05 mm to 2.5 mm.

Figure 9:
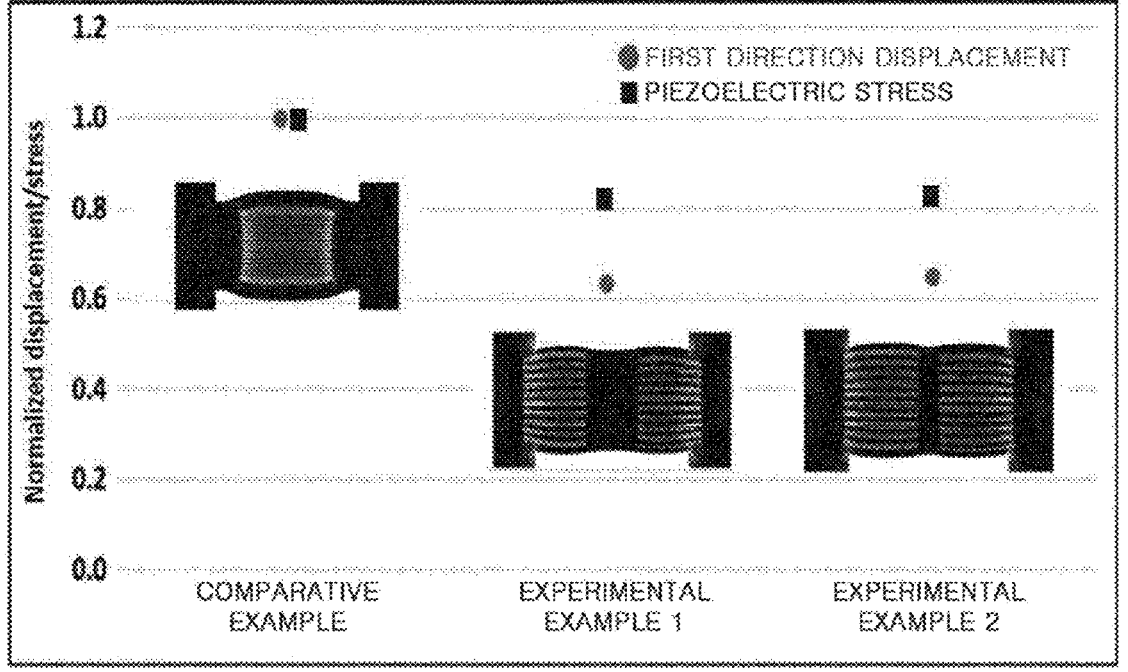
FIG. 9 is a view illustrating simulation results measuring first direction displacement and piezoelectric stress.

FIG. 9 is a view illustrating simulation results measuring first direction displacement and piezoelectric stress.

Figure 8:
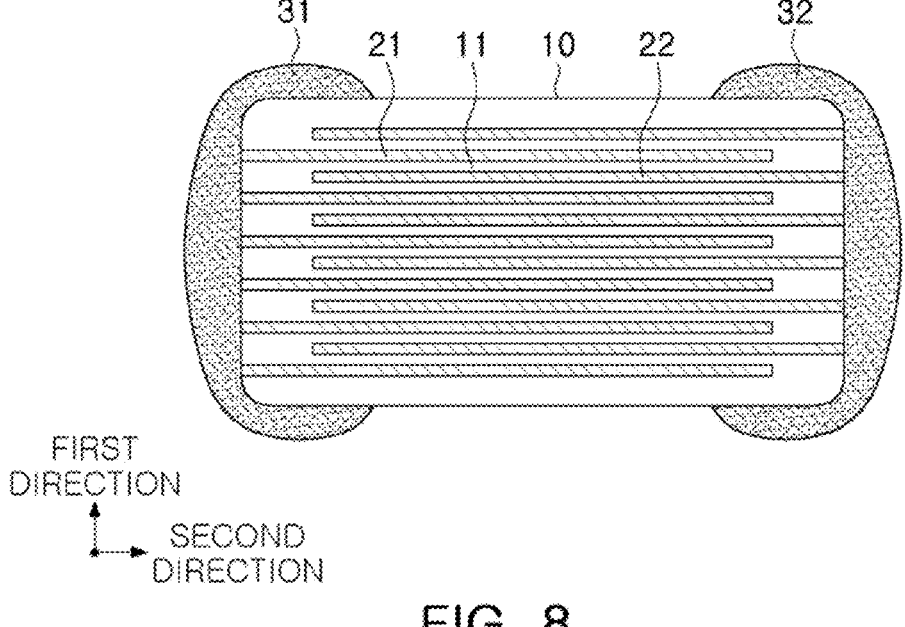
FIG. 8 is a cross-sectional view schematically illustrating a cross-section of a conventional multilayer ceramic capacitor.

Specifically, Comparative Example was the conventional multilayer ceramic capacitor illustrated in FIG. 8, and Experimental Examples 1 and 2 were multilayer electronic components according to an embodiment of the present disclosure. In this case, sizes of bodies of Comparative Example, Experimental Example 1, and Experimental Example 2 in the second direction was set to 4.0 mm, and sizes thereof in the third direction was set to 3.0 mm, respectively.

In the Comparative Example, a length of a capacitance formation portion in which a first internal electrode 21 and a second internal electrode 22 overlap in a stacking direction, illustrated in FIG. 8, was set to 2.0 mm. In Experimental Example 1, a length of a first capacitance formation portion Ac1 and a length of a second capacitance formation portion Ac2 were set to 1.25 mm, and a length of a third capacitance formation portion Ac3 was set to 0.7 mm. In Experimental Example 2, a length of a first capacitance formation portion Ac1 and a length of a second capacitance formation portion Ac2 were set to 1.40 mm, and a length of a third capacitance formation portion Ac3 was set to 0.4 mm. Afterwards, the number of stacks was determined so that capacitance of the Comparative Example, capacitance of the Experimental Example 1, and capacitance of the Experimental Example 2 were 100 pF, respectively, and, in this case, first direction displacement and piezoelectric stress were measured by simulation.

Referring to FIG. 9, it can be confirmed that in the Experimental Examples 1 and 2, first direction displacement was reduced by about 40%, and piezoelectric stress was reduced by about 20%, as compared to the Comparative Example. As a result, it can be confirmed that, when having the same capacitance, the present disclosure may reduce piezoelectric stress more effectively than the prior art.

The present disclosure is not limited by the above-described embodiments and accompanying drawings, but is intended to be limited by the appended claims. Therefore, various forms of substitution, modification, and change will be possible by those skilled in the art within the scope of the technical spirit of the present disclosure described in the claims, and this will also be said to fall within the scope of the present disclosure.

In addition, the expression 'an embodiment' does not indicate the same embodiment, and is provided to emphasize and describe different unique characteristics. However, an embodiment presented above is not excluded from being implemented in combination with features of another embodiment. For example, even if a matter described in one detailed embodiment is not described in another embodiment, and it can be understood as a description related to another embodiment, unless there is a description contradicting or contradicting the matter in another embodiment.

In addition, expressions such as first and second are used to distinguish one component from another, and do not limit the order and/or importance of the components. In some cases, without departing from the scope of rights, a first element may be named a second element, and similarly, a second element may be named a first element.

As one of many effects of the present disclosure, it is possible to improve a withstand voltage, suppress occurrence of cracks due to piezoelectric stress, and minimize a decrease in capacitance.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
   a body having first and second surfaces opposing in a first direction, third and fourth surfaces connected to the first and second surfaces and opposing in a second direction, and fifth and sixth surfaces connected to the first to fourth surfaces and opposing in a third direction, the body including a first internal electrode layer including a first dielectric layer and a first internal electrode disposed on the first dielectric layer, a second internal electrode layer including a second dielectric layer and a second internal electrode disposed on the second dielectric layer, and an auxiliary electrode layer including a third dielectric layer and a first auxiliary electrode and a second auxiliary electrode disposed on the third dielectric layer and spaced apart from each other in the second direction, wherein the first internal electrode layer and the second internal electrode layer are alternately disposed in the first direction with the auxiliary electrode layer interposed therebetween;
   a first external electrode disposed on the third surface and connected to the first internal electrode and the first auxiliary electrode; and
   a second external electrode disposed on the fourth surface and connected to the second internal electrode and the second auxiliary electrode,
   wherein at least a portion of the first internal electrode overlaps the second auxiliary electrode in the first direction, and at least a portion of the second internal electrode overlaps the first auxiliary electrode in the first direction.

2. The multilayer electronic component of claim 1, satisfying L1+L2>L3, where L1 is a length in the second direction at which the second internal electrode and the first auxiliary electrode overlap each other in the first direction, L2 is a length in the second direction at which the first internal electrode and the second auxiliary electrode overlap each other in the first direction, and L3 is a distance at which the first auxiliary electrode and the second auxiliary electrode are spaced apart from each other in the second direction, based on cross-sections of the body in the first and second directions.

3. The multilayer electronic component of claim 2, further satisfying L1>L3 and L2>L3.

4. The multilayer electronic component of claim 2, further satisfying 0.5×Lo≤L1+L2≤0.9×Lo, where Lo is a size of the body in the second direction.

5. The multilayer electronic component of claim 2, further satisfying 0.05×Lo≤L3≤0.4×Lo, where Lo is a size of the body in the second direction.

6. The multilayer electronic component of claim 1, wherein the body comprises a plurality of first capacitance formation portions each including two first auxiliary electrodes adjacent to each other in the first direction disposed with the second internal electrode interposed therebetween, a plurality of second capacitance formation portions each including two second auxiliary electrodes adjacent to each other in the first direction disposed with the first internal electrode interposed therebetween, and a third capacitance formation portion including the first internal electrode and the second internal electrode alternately disposed through a region in which the first auxiliary electrode and the second auxiliary electrode are spaced apart from each other in the second direction.

7. The multilayer electronic component of claim 6, wherein the plurality of first capacitance formation portions are arranged in the first direction and the plurality of second capacitance formation portions are arranged in the first direction, and the plurality of first capacitance formation portions are arranged to be staggered with the plurality of second capacitance formation portions.

8. The multilayer electronic component of claim 1, wherein the body comprises a stacked portion in which the first and second internal electrodes are alternately disposed with the first and second auxiliary electrodes interposed therebetween, and a cover portion disposed on both surfaces of the stacked portion facing the first direction.

9. The multilayer electronic component of claim 8, wherein the first internal electrode, the second internal electrode, the first auxiliary electrode, and the second auxiliary electrode are not disposed in the cover portion.

10. The multilayer electronic component of claim 8, wherein the cover portion comprises a first dummy electrode connected to the first external electrode, and a second dummy electrode spaced apart from the first dummy electrode and connected to the second external electrode.

11. The multilayer electronic component of claim 10, wherein the first dummy electrode is spaced apart from an end of the second internal electrode in the second direction, and the second dummy electrode is spaced apart from an end of the first internal electrode in the second direction.

12. A multilayer electronic component comprising:
a body having first and second surfaces opposing in a first direction, third and fourth surfaces connected to the first and second surfaces and opposing in a second direction, and fifth and sixth surfaces connected to the first to fourth surfaces and opposing in a third direction, the body comprising a plurality of first internal electrode layers each including a first dielectric layer and a first internal electrode disposed on the first dielectric layer, a plurality of second internal electrode layers each including a second dielectric layer and a second internal electrode disposed on the second dielectric layer, and a plurality of auxiliary electrode layers each including a third dielectric layer and first and second auxiliary electrodes disposed on the third dielectric layer and spaced apart from each other in the second direction, wherein the plurality of first internal electrode layers and the plurality of second internal electrode layers are alternately disposed in the first direction with each of the auxiliary electrode layers interposed therebetween;

a first external electrode disposed on the third surface and connected to the first internal electrodes and the first auxiliary electrodes; and a second external electrode disposed on the fourth surface and connected to the second internal electrodes and the second auxiliary electrodes, wherein at least a portion of the first internal electrodes overlaps the second auxiliary electrodes in the first direction, and at least a portion of the second internal electrodes overlaps the first auxiliary electrodes in the first direction, and wherein some of the auxiliary electrode layers are disposed in a center portion of the body in the first direction.

13. The multilayer electronic component of claim 12, wherein the body comprises a plurality of first capacitance formation portions each including two first auxiliary electrodes adjacent to each other in the first direction disposed with e of the second internal electrodes interposed therebetween, a plurality of second capacitance formation portions each including two second auxiliary electrodes adjacent to each other in the first direction disposed with one of the first internal electrodes interposed therebetween, and a third capacitance formation portion including the first t internal electrodes and the second internal electrodes alternately disposed through a region in which the first auxiliary electrodes and the second auxiliary electrodes are spaced apart from each other in the second direction.

14. The multilayer electronic component of claim 13, wherein the plurality of first capacitance formation portions are arranged in the first direction and the plurality of second capacitance formation portions are arranged in the first direction, and the plurality of first capacitance formation portions are arranged to be staggered with the plurality of second capacitance formation portions.

15. The multilayer electronic component of claim 12, wherein the body comprises a stacked portion in which the first and second internal electrodes are alternately disposed with the first and second auxiliary electrodes interposed therebetween, and a cover portion disposed on both surfaces of the stacked portion facing the first direction.

16. The multilayer electronic component of claim 15, wherein there are no first and second internal electrodes that are directly adjacent to each other without any of the first and second auxiliary electrodes interposed therebetween in the stacked portion.

* * * * *